US012670395B2

(12) United States Patent
Fedorov et al.

(10) Patent No.: US 12,670,395 B2
(45) Date of Patent: Jun. 30, 2026

(54) NEURAL NETWORK SYSTEM AND TRAINING METHOD

(71) Applicant: Arm Limited, Cambridge (GB)

(72) Inventors: Igor Fedorov, Ashland, MA (US); Paul Nicholas Whatmough, Cambridge, MA (US)

(73) Assignee: Arm Limited, Cambridge (GB)

( * ) Notice: Subject to any disclaimer, the term of this patent is extended or adjusted under 35 U.S.C. 154(b) by 1071 days.

(21) Appl. No.: 17/576,101

(22) Filed: Jan. 14, 2022

(65) Prior Publication Data

US 2023/0229921 A1     Jul. 20, 2023

(51) Int. Cl.
*G06N 3/082*          (2023.01)
*G06N 3/10*           (2006.01)

(52) U.S. Cl.
CPC .............. *G06N 3/082* (2013.01); *G06N 3/10* (2013.01)

(58) Field of Classification Search
CPC ................................. G06N 3/082; G06N 3/10
USPC .......................................................... 706/25
See application file for complete search history.

(56) References Cited

U.S. PATENT DOCUMENTS 12,008,467 B2 * 6/2024 Yang ...................... G06N 3/063
12,248,877 B2 * 3/2025 Xu ............................ G06T 7/70

2021/0357753 A1 * 11/2021 Kim .......................... G06N 3/08
2021/0397963 A1 * 12/2021 Jiang ...................... G06N 3/082
2022/0021477 A1 * 1/2022 Ge ......................... H04L 1/0041

OTHER PUBLICATIONS

Lin et al., "Dynamic Model Pruning with Feedback," https://arxiv.org/abs/2006.07253, arXiv:2006.07253 [cs.LG], Jun. 12, 2020.
Li et all, "An Exponential Learning Rate Schedule for Deep Learning," https://arxiv.org/abs/1910.07454, arXiv:1910.07454, [cs.LG], Nov. 21, 2019.
Bhalgat et al., "LSQ+: Improving low-bit quantization through learnable offsets and better initialization," https://arxiv.org/abs/2004.09576, arXiv:2004.09576 [cs.CV], Apr. 20, 2020.
Choi et al., "Learning Sparse Low-Precision Neural Networks With Learnable Regularization," https://arxiv.org/abs/1809.00095, arXiv:1809.00095 [cs.CV], May 24, 2020.

* cited by examiner

*Primary Examiner* — Tsu-Chang Lee
(74) *Attorney, Agent, or Firm* — Leveque Intellectual Property Law, P.C.

(57)          ABSTRACT

Neural network systems and methods are provided. One method for processing a neural network includes, for at least one neural network layer that includes a plurality of weights, applying an offset function to each of a plurality of weight values in the plurality of weights to generate an offset weight value, and quantizing the offset weight values to form quantized offset weight values. The plurality of weights are pruned. One method for executing a neural network includes reading, from a memory, at least one neural network layer that includes quantized offset weight values and an offset value α, and performing a neural network layer operation on an input feature map, based on the quantized offset weight values and the offset value α, to generate an output feature map. The quantized offset weight values are signed integer numbers.

13 Claims, 11 Drawing Sheets

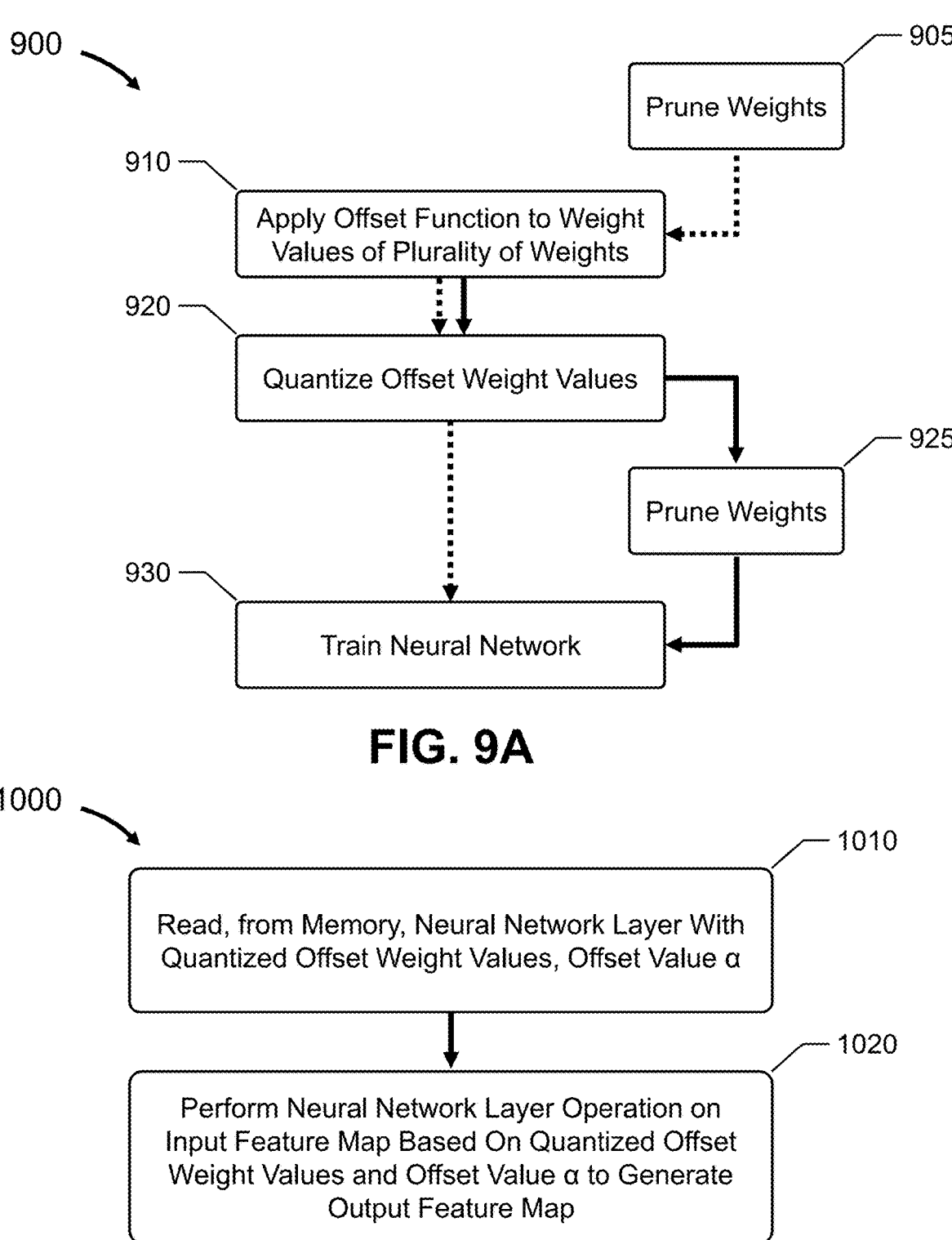

900

905

910

Prune Weights

Apply Offset Function to Weight Values of Plurality of Weights

920

Quantize Offset Weight Values

925

Prune Weights

930

Train Neural Network

Read, from Memory, Neural Network Layer With Quantized Offset Weight Values, Offset Value α

1020

Perform Neural Network Layer Operation on Input Feature Map Based On Quantized Offset Weight Values and Offset Value α to Generate Output Feature Map

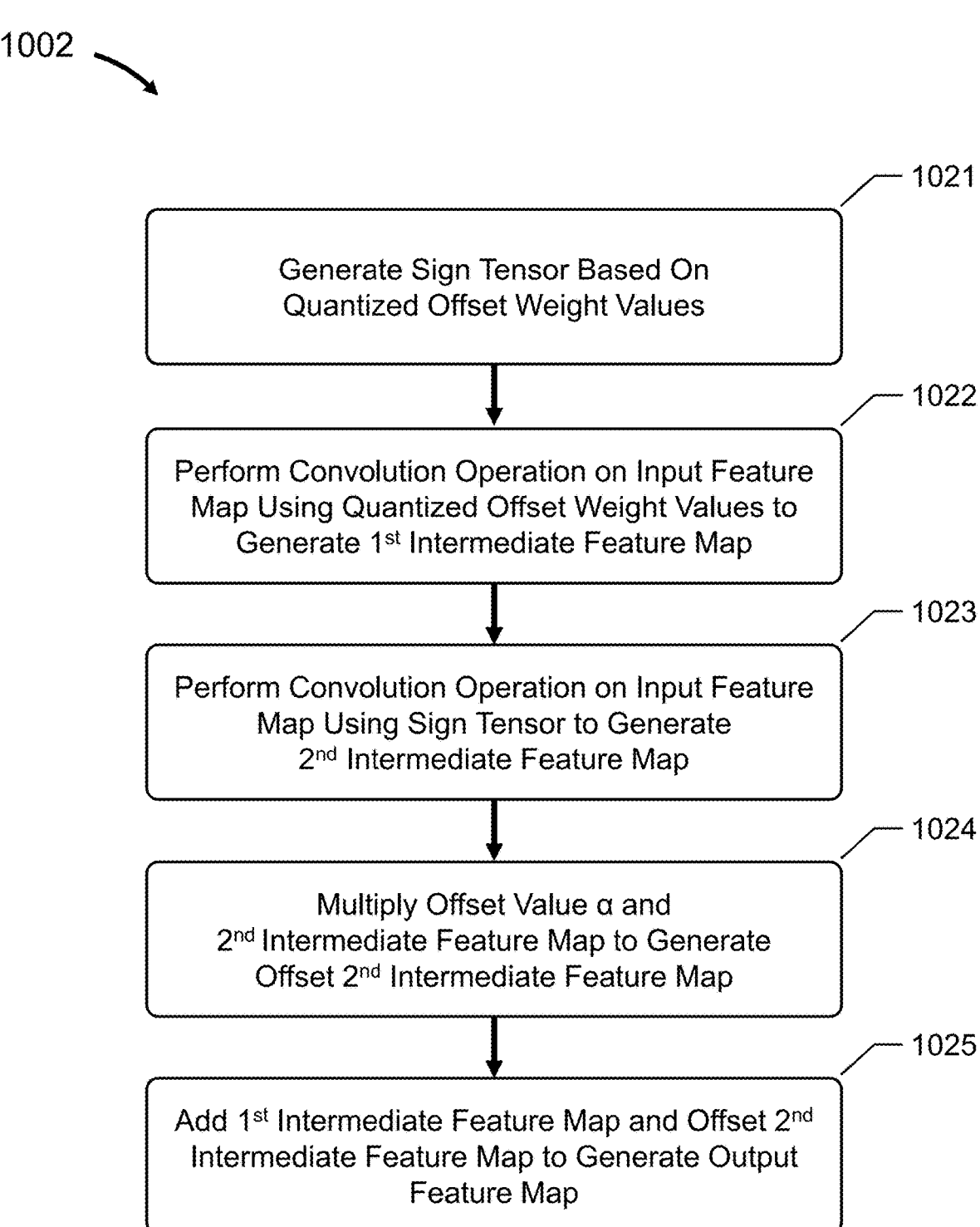

1021

Generate Sign Tensor Based On Quantized Offset Weight Values

1022

Perform Convolution Operation on Input Feature Map Using Quantized Offset Weight Values to Generate 1st Intermediate Feature Map

1023

Perform Convolution Operation on Input Feature Map Using Sign Tensor to Generate 2nd Intermediate Feature Map

1024

Multiply Offset Value α and 2nd Intermediate Feature Map to Generate Offset 2nd Intermediate Feature Map

1025

Add 1st Intermediate Feature Map and Offset 2nd Intermediate Feature Map to Generate Output Feature Map

NEURAL NETWORK SYSTEM AND TRAINING METHOD

BACKGROUND

The present disclosure relates to computer systems. More particularly, the present disclosure relates to neural networks.

A neural network (NN), such as an artificial neural network (ANN), a convolutional neural network (CNN), etc., is a popular solution to a wide array of challenging classification, recognition and regression problems. However, many NNs require a large number of calculations involving a large number of weights and activations, which presents a significant challenge with respect to access, storage and performance, particularly for mobile and other power or storage-constrained devices.

While pruning and quantization may individually reduce the complexity of a neural network, the combination of these two techniques produces a highly-sparse, quantized neural network with reduced accuracy when compared to the original neural network.

BRIEF DESCRIPTION OF THE DRAWINGS

FIG. 9A depicts a flow diagram representing functionality associated with processing a neural network, in accordance with embodiments of the present disclosure.

FIGS. 9B, 9C and 9D depict flow diagrams representing functionality associated with executing a neural network, in accordance with embodiments of the present disclosure.

DETAILED DESCRIPTION

Figure 1:
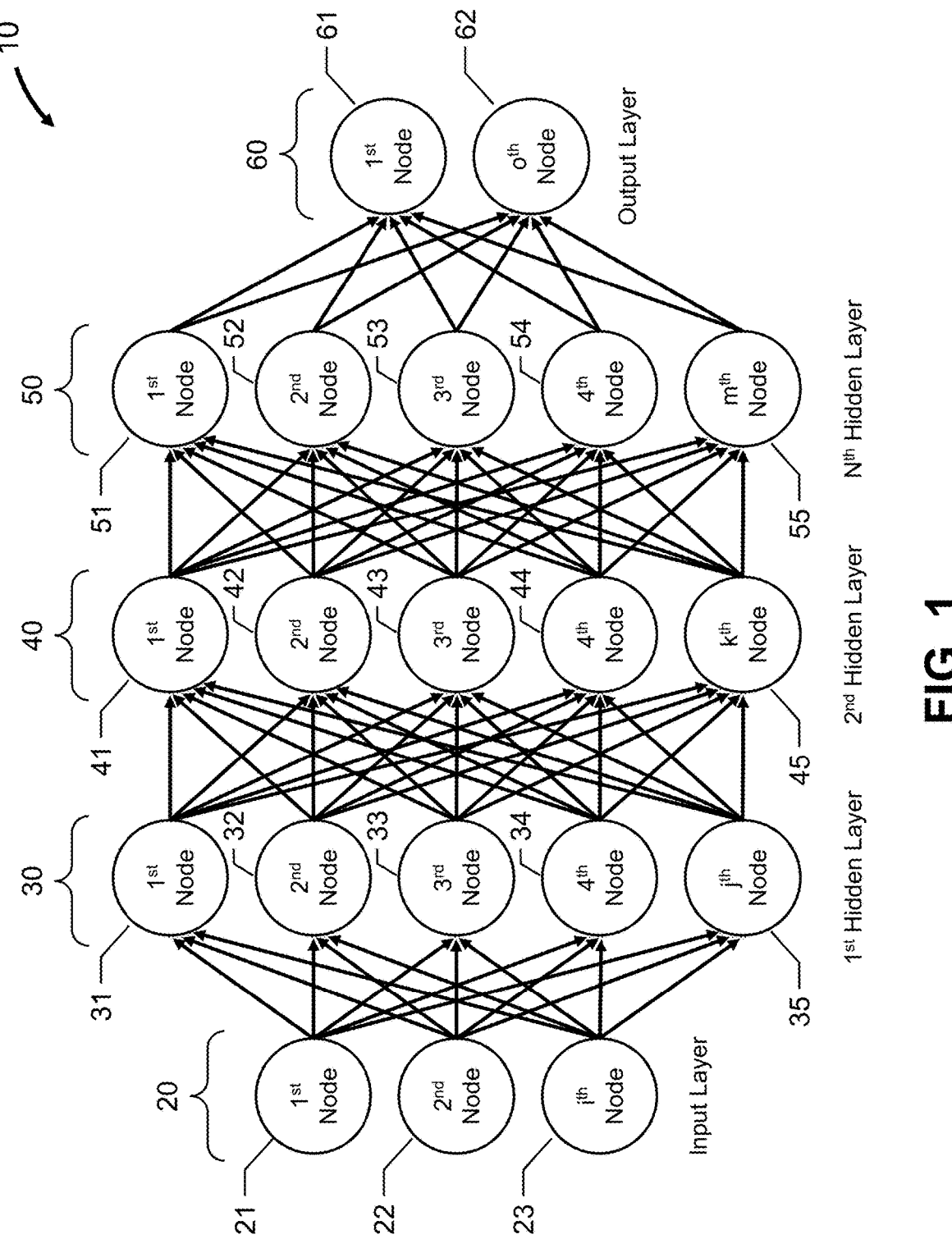
FIG. 1 depicts an ANN, in accordance with embodiments of the present disclosure.

Embodiments of the present disclosure will now be described with reference to the drawing figures, in which like reference numerals refer to like parts throughout.

Neural networks require massive amounts of storage space and computational resources to run. Two techniques for reducing the complexity of neural networks include unstructured pruning and quantization. Combining these two techniques may produce highly sparse, quantized neural networks, which reduces the memory and computational resources required at inference time, at the cost of reduced accuracy.

Embodiments of the present disclosure train and deploy performant low-bitwidth, sparse neural networks by advantageously combining a number system for representing low-bitwidth, sparse tensors and a training algorithm that combines dynamic magnitude pruning with low-bitwidth training methodologies.

In one embodiment, a method for processing a neural network includes, for at least one neural network layer that includes a plurality of weights, applying an offset function to each of a plurality of weight values in the plurality of weights to generate an offset weight value, and quantizing the offset weight values to form quantized offset weight values. The plurality of weights are pruned.

In another embodiment, a method for executing a neural network includes reading, from a memory, at least one neural network layer that includes quantized offset weight values and an offset value $\alpha$, and performing a neural network layer operation on an input feature map, based on the quantized offset weight values and the offset value $\alpha$, to generate an output feature map. The quantized offset weight values are signed integer numbers.

A neural network models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the data that are input to the hidden layer to produce the data that are output by the hidden layer. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tanh function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation value that is provided to the activation function for that node. The output of the activation function is then provided as an input data value to each output layer node. At each output layer node, the output data value received from each hidden layer node is multiplied by a respective connection weight, and the resulting products are summed or accumulated into an activation value that is provided to the activation function for that node. The output of the activation function is then provided as output data. Additional hidden layers may be similarly configured to process data.

FIG. 1 depicts ANN 10, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 3, i equals 3, j, k and m equal 5 and o equals 2. Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers. MLPs may be used for natural language processing applications, such as machine translation, speech recognition, etc. Other ANNs include recurrent neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 2:
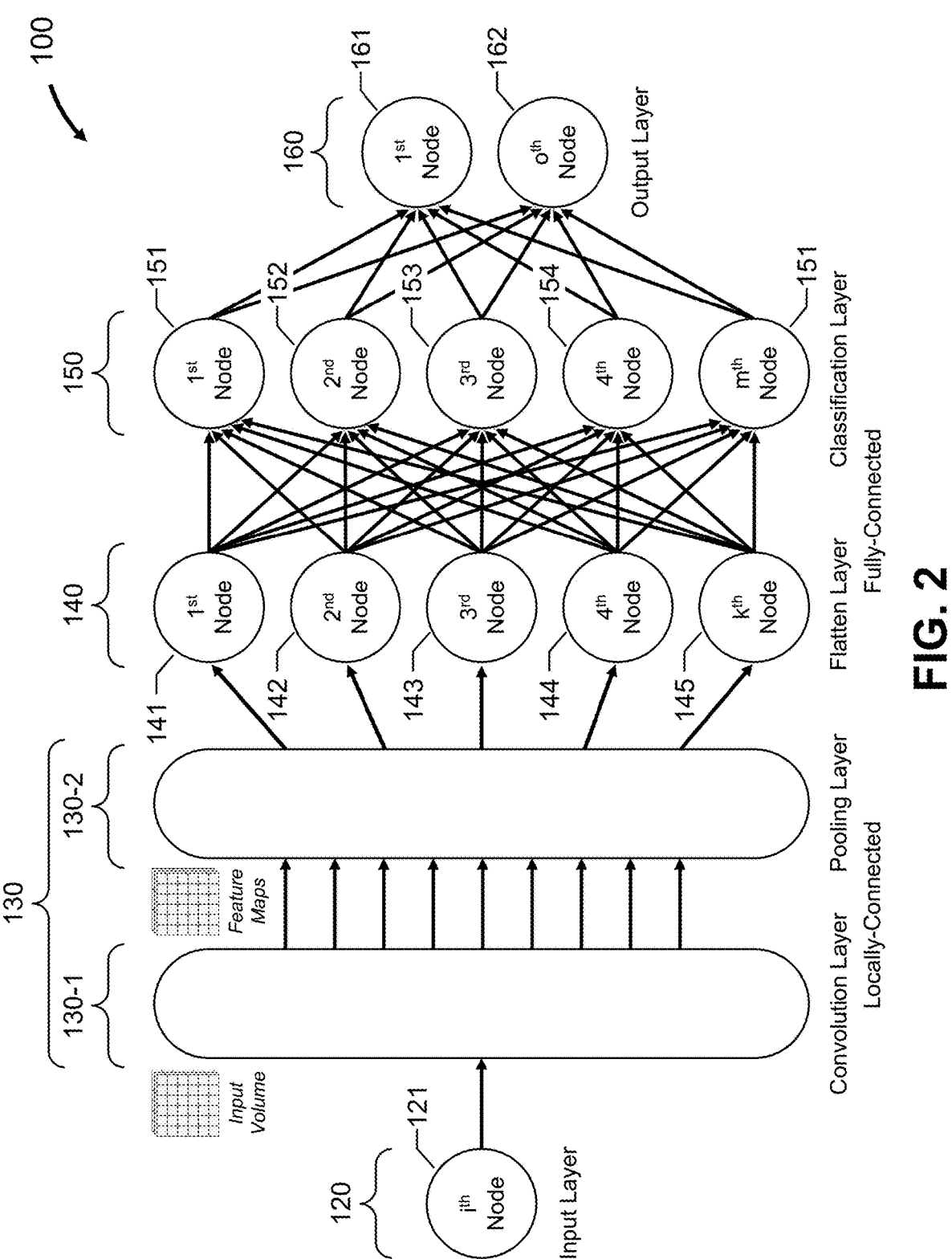
FIG. 2 depicts a CNN, in accordance with embodiments of the present disclosure.

FIG. 2 depicts CNN 100, in accordance with an embodiment of the present disclosure. CNN 100 includes input layer 120, one or more hidden layers, such as convolutional layer 130-1, pooling layer 130-2, hidden (flatten) layer 140, hidden (classification) layer 150, etc., and output layer 160. Many other variations of input, hidden and output layers are contemplated.

Input layer 120 includes one or more input nodes 121, etc., that present the input data, such as a color image, as an input volume to the first convolutional layer, e.g., convolutional layer 130-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 130-1 is locally-connected to input layer 120, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLU layer.

Pooling layer 130-2 is locally-connected to convolutional layer 130-1, and includes a plurality of nodes that are connected to local regions in the input volume (not depicted for clarity). Pooling layer 130-2 also produces an output volume that is provided as the input volume to the subsequent layer, such as, for example, another convolutional layer 130-1, a flatten layer 140, etc. In certain embodiments, convolutional layer 130-1 and pooling layer 130-2 form a single hidden layer 130. Similarly, in certain embodiments, convolutional layer 130-1, a ReLU layer and pooling layer 130-2 form a single hidden layer 130. Generally, the output volumes of the convolutional and pooling layers may be described as feature maps, and one or more single hidden layers 130 form a feature learning portion of CNN 100.

Hidden layer 140 is a "flatten" layer that is locally-connected to pooling layer 130-2, and includes one or more hidden (flatten) nodes 141, 142, 143, 144, 145, etc. Hidden (flatten) layer 140 "flattens" the output volume produced by the preceding pooling layer 130-2 into a column vector, which is provided to the subsequent, fully-connected hidden layer 150.

Hidden layer 150 is a classification layer that is fully-connected to hidden (flatten) layer 140, and includes one or more hidden (classification) nodes 151, 152, 153, 154, 155, etc.

Output layer 160 includes one or more output nodes 161, 162, etc., and is fully-connected to hidden (classification) layer 150. Fully-connected output layer 160 receives the classification results output by hidden (classification) layer

150, and each node outputs a predicted class score. A normalization function, such as a SoftMax function, may be applied to the predicted class scores by output layer 160, or, alternatively, by an additional layer interposed between hidden (classification) layer 150 and output layer 160.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, multiply-and-accumulate (MAC) operations, are used extensively by CNNs, as well as other ANNs.

Quantization and pruning are the two key techniques to reduce the inference time cost of NNs, ANNs, CNNs, etc. Quantization restricts the set of unique symbols used to represent neural network weights, such that they can be encoded as low-bitwidth (e.g., 2-bit, 4-bit, or 8-bit) integers. Pruning seeks to set as many neural network weights to 0 as possible. Both quantization and pruning enable compression of neural network weights, which reduces the static memory footprint of the neural network on the device. In addition, low-bitwidth, sparse neural networks can be executed more efficiently by specially designed hardware, both in terms of latency and power consumption. As such, data types and training algorithms for low-bitwidth, sparse neural networks are of particular interest.

However, training low-bitwidth, sparse neural networks is not straightforward. Pruning and low-bitwidth quantization represent opposing forces, and this conflict leads to suboptimal network performance under a conventional small-integer number system.

Sparse, low-bitwidth tensors are easily compressible, since their entropy is significantly lower than corresponding dense, floating-point tensors. For example, a wide ResNet 20-10 architecture has about 26.8 million weights. This network occupies 102.3 MB of Flash memory. Quantizing this network to 4 bits reduces the storage size to 12.8 MB. Pruning the 4 bit model to 95% zeros reduces the storage cost even further to 1.6 MB. One clear benefit of sparse, low-bitwidth neural networks is reduced storage cost. Reduced storage cost can also translate into reduced inference latency and power consumption, since less bits must be fetched to generate the network output.

Additionally, operations on sparse, low-bitwidth tensors have inherent hardware benefits. In the case of low-bitwidth weight tensors, specialized hardware and/or software can reduce the cost of operations where one or more of the operands has low-bitwidth. In the case of sparse tensors, specialized hardware can achieve inference speedups which scale with the pruning rate.

Generally, neural network training solves the following empirical risk minimization problem given by Equation (1):

$$\text{argmin}_W E_D[L(W, d)] \tag{1}$$

where M denotes the number of layers in the neural network, $w^m$ denotes the (vectorized) weights for neural network layer m, $W = \{w^m\}^M_{m=1}$, D denotes a training set, d denotes an element from the training set, and L is the cost-function. For classification problems, for example, D would be a dataset of pairs (x,y) where x is an image and y is a label, and L would be the cross-entropy. Typically, Equation (1) is solved using stochastic gradient descent (SGD).

In one embodiment, a quantized neural network may be trained using a Quantization Aware Training (QAT) method given by Equation (2):

$$\text{argmin}_W E_D[L(q(W), d)] \tag{2}$$

where q is a quantization function. Many embodiments of the present disclosure employ a version of uniform symmetric quantization given by Equation (3):

$$q(w, w_{max}, b) = r * \text{round}\left(\frac{\text{clip}(w, -w_{max}, w_{max})}{r}\right),$$
$$r = \frac{w_{max}}{2^{b-1} - 1} \tag{3}$$

where b is the bitwidth. Solving Equation (2) with stochastic gradient descent requires approximating the gradient of q (which is not-differentiable almost-everywhere), typically by assuming that the gradient of the round function is 1, which is also known as the straight-through estimator.

In many embodiments, training sparse neural networks may be performed by solving the problem given by Equation (4):

$$\text{argmin}_{W,\Omega} E_D[L(W \odot \Omega, d)], \ \Omega = \{\omega^m\}^M_{m=1}, \|\omega^m\|_0 \le s^m \tag{4}$$

where $\odot$ denotes the Hadamard (elementwise) product and $\omega^m$ is the binary pruning mask for layer m with $s^m$ non-zeros. In one embodiment, w is sorted by magnitude and the s largest elements are retained. During backpropogation, STE is applied to $w^m \odot \omega^m$ and the masks are recomputed at regular intervals to allow for the set of pruned weights to change.

A baseline training technique for training sparse, low-bitwidth neural networks is given by Equation (5):

$$\text{argmin}_{W,\Omega} E_D[L(q(W) \odot \Omega, d)], \ \Omega = \{\omega^m\}^M_{m=1}, \|\omega^m\|_0 \le s^m \tag{5}$$

where low-bitwidth refers to bitwidths b>1.

In one embodiment, a simplified training technique includes the following functionality:

(a) Solve Equation (1), yielding a set of (locally) optimal, dense, floating-point weights W*;

(b) Quantize W* to 4 bits using Equation (4), using $w^m_{max} = \max |w*^{,m}|$ yielding weights W*$_q$;

(c) Prune weights W*$_q$ to sparsity level of 95% (set 95% of the values to 0) using magnitude pruning, yielding weights W*$_{qp}$.

This functionality represents a simplification of Equation (5) because training does not take place after step (a) and the underlying weights W* do not change in steps (b) and (c).

Figure 3:
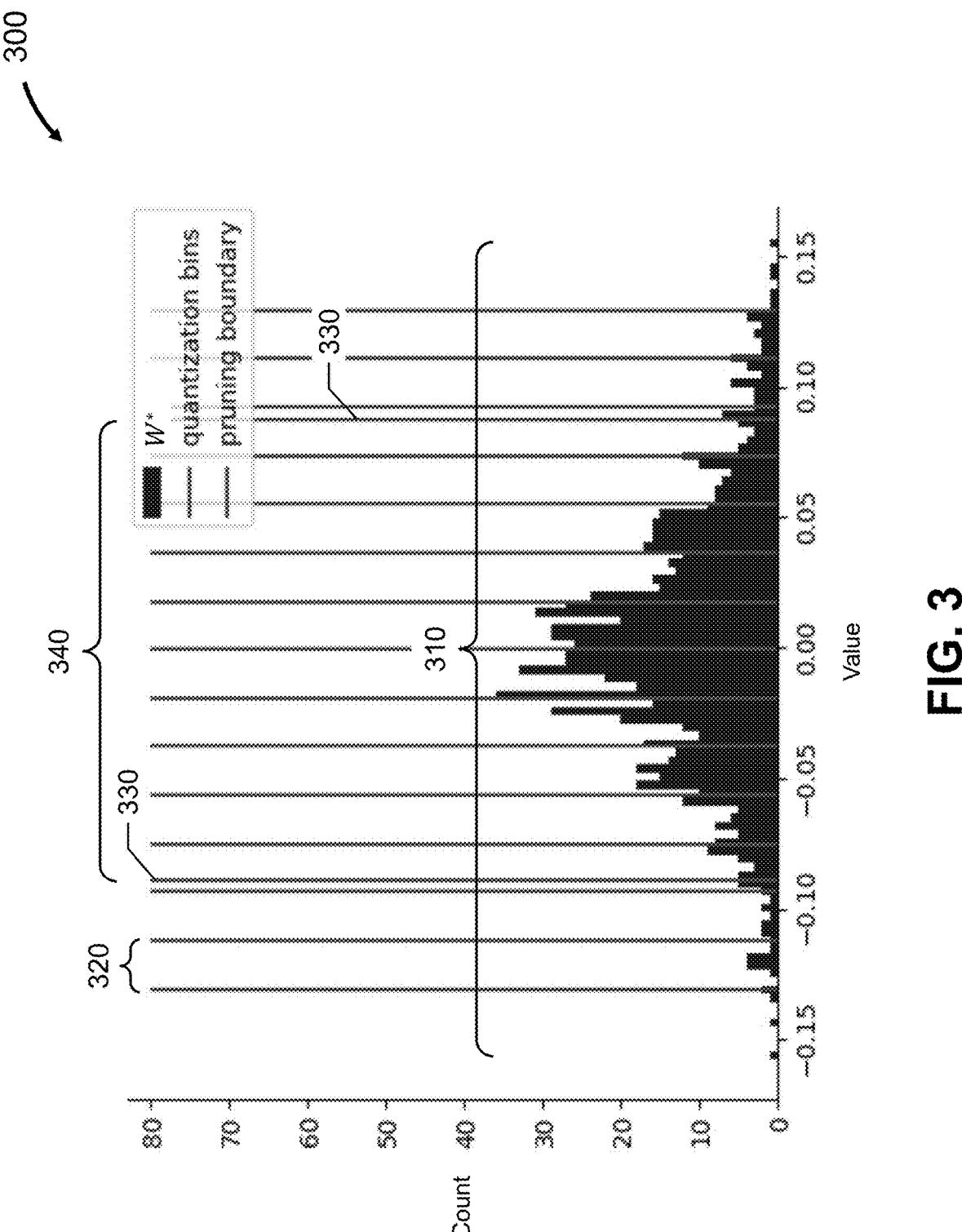
FIG. 3 depicts a histogram of weights W*, in accordance with an embodiment of the present disclosure.

FIG. 3 depicts histogram 300 of weights W* 310, in accordance with an embodiment of the present disclosure.

Histogram 300 plots the count or frequency of weights W* 310 from a layer of a neural network along the y axis and the floating point value of weights W* 310 along the x axis prior to processing by the baseline training technique, i.e., Equation (5). Histogram 300 also depicts quantization intervals of bins 320, pruning boundaries 330 and pruning zone 340 disposed between pruning boundaries 330. Every value within pruning zone 340 is mapped to 0.

Quantizing weights W* 310 to 4 bits produces 16 (i.e., $2^4$) unique symbols with which to represent the floating point values of weights W* 310. Eight (8) unique symbols (including 0) represent the positive entries of weights W* 310, and eight (8) unique symbols represent the negative entries of weights W* 310. In this embodiment, nine (9) bins are unused since they fall inside pruning zone 340.

Figure 4:
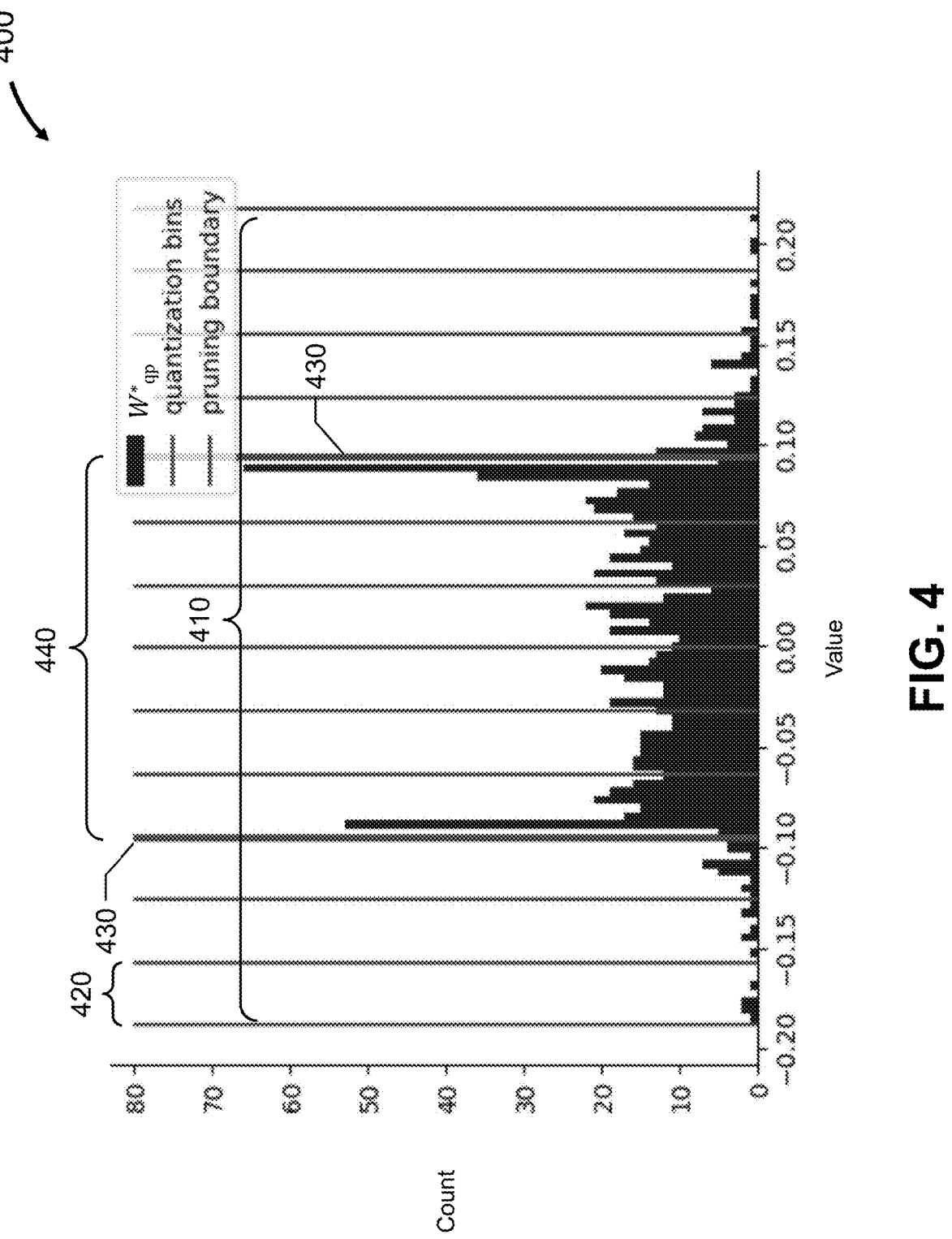
FIG. 4 depicts a histogram of weights $W^*_{qp}$, in accordance with an embodiment of the present disclosure.

FIG. 4 depicts histogram 400 of weights $W^*_{qp}$ 410, in accordance with an embodiment of the present disclosure.

Histogram 400 plots the count or frequency of weights $W^*_{qp}$ 410 from the same layer of the neural network along the y axis and the floating point value of weights $W^*_{qp}$ 410 along the x axis after processing by the baseline training technique, i.e., Equation (5). Histogram 400 also depicts quantization intervals of bins 420, pruning boundaries 430 and pruning zone 440 disposed between pruning boundaries 430.

In this embodiment, the optimizer adjusts the underlying floating point weight values in order to utilize more of the quantization bins outside of the pruning zone, which increases their dynamic range. For example, the dynamic range of the weights increases from 0.15 (i.e., weights W* 310 in FIG. 3) to 0.2 (i.e., weights $W^*_{qp}$ 410 in FIG. 4). In certain embodiments, solving Equation (5) tends to increase the dynamic range of the neural network weights which may lead to reduced optimization properties and, ultimately, reduced classification accuracy. Weight dynamic range is likely closely tied to stochastic gradient descent dynamics, and large dynamic range correlates to poor problem conditioning. The effective learning rate, defined as rate at which the angle of the weight vector changes, scales inversely with weight norm, and increasing weight dynamic range leads to slower learning.

Embodiments of the present disclosure advantageously use more quantization bins to encode the unpruned weights by essentially "cutting out" pruning zone 440 between pruning boundaries 430 before applying uniform quantization. In other words, only the weights falling outside pruning zone 440 are quantized. Cutting out the pruning zone includes several steps, including:

Shifting any positive weight left by a predetermined amount (e.g., 0.1) and shifting any negative weight right by the predetermined amount (e.g., 0.1).

Perform uniform quantization

Shifting the resultant weights back to the original range by shifting any positive weight by the predetermined amount (e.g., 0.1) and shifting any negative weight left by the predetermined amount (e.g., 0.1)

Equation (6) presents a modified number system that includes an offset α:

$$q(w, w_{max}, \alpha, b) =$$
$$\text{sign}(w) * \alpha + r * \text{round}\left(\frac{\text{clip}(w - \text{sign}(w) * \alpha, -w_{max}, w_{max})}{r}\right) \quad (6)$$

Advantageously, setting α>0 allows quantization over a range which excludes the interval [−α, α]. In certain embodiments, α is set to be the largest pruned value of w.

Figure 5:
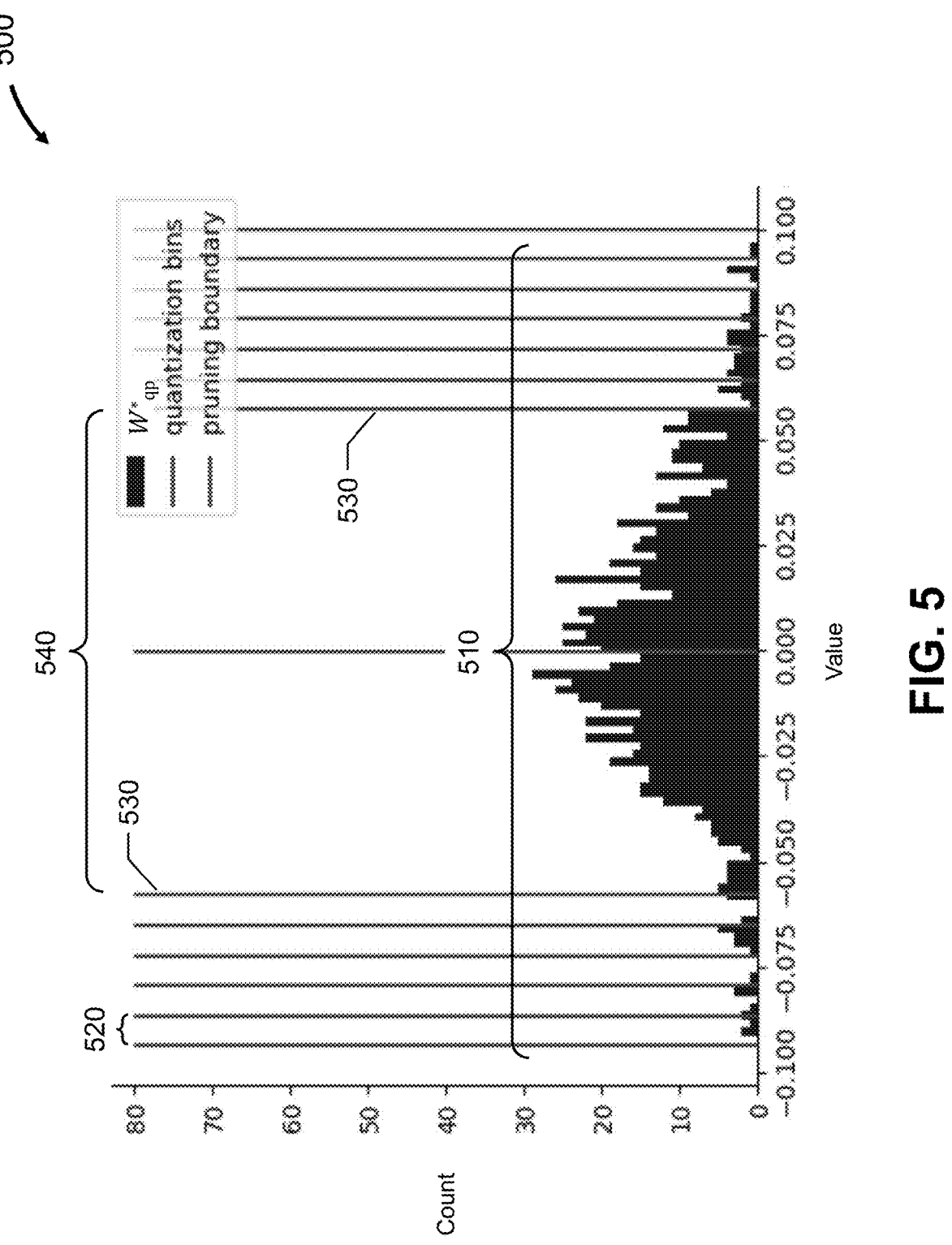
FIG. 5 depicts a histogram of weights $W^*_{qp}$, in accordance with an embodiment of the present disclosure.

FIG. 5 depicts histogram 500 of weights $W^*_{qp}$ 510, in accordance with an embodiment of the present disclosure.

Histogram 500 plots the count or frequency of weights $W^*_{qp}$ 510 from the same layer of the neural network along the y axis and the floating point value of weights $W^*_{qp}$ 510 along the x axis prior to processing by the baseline training technique, i.e., Equation (5), using the modified number system, i.e., Equation (6). Histogram 500 also depicts quantization intervals of bins 520 pruning boundaries 530 and pruning zone 540 disposed between pruning boundaries 530.

Advantageously, the quantizer symbols (i.e., quantization bins) are fully utilized on the un-pruned values, and, additionally, the quantizer has only a single extra parameter for every weight tensor so the additional storage cost is negligible.

Figure 6:
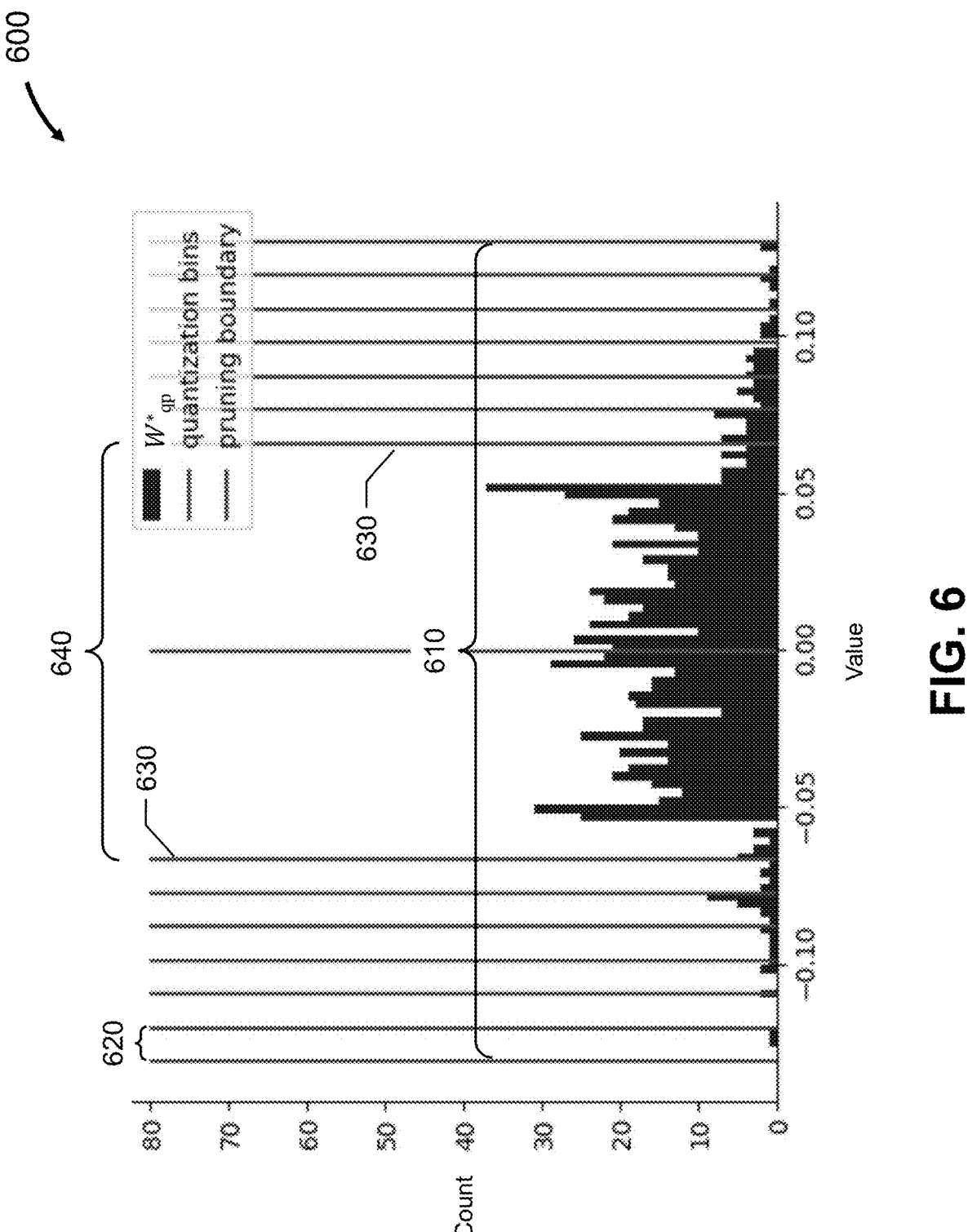
FIG. 6 depicts a histogram of weights $W^*_{qp}$, in accordance with an embodiment of the present disclosure.

FIG. 6 depicts histogram 600 of weights $W^*_{qp}$ 610, in accordance with an embodiment of the present disclosure.

Histogram 600 plots the count or frequency of weights $W^*_{qp}$ 610 from the same layer of the neural network along the y axis and the floating point value of weights $W^*_{qp}$ 610 along the x axis after processing by the baseline training technique, i.e., Equation (5), using the modified number system, i.e., Equation (6). Histogram 600 also depicts quantization intervals of bins 620, pruning boundaries 630 and pruning zone 640 disposed between pruning boundaries 630.

Advantageously, the dynamic range of the weights does not increase from histogram 500 to histogram 600, showing that the modified number system resolves the dynamic range issue induced by a traditional number system.

Embodiments of the present disclosure include sparse, quantized neural networks that have been trained using the above techniques. Generally, the details may depend on the properties of the offset α.

In many embodiments, the offset α is a floating-point number. In this case, the neural network would be stored in its integer representation, before applying the offset α, i.e., only the second term in Equation (6) would be stored. During inference, the integer weights are loaded from memory and used to do an integer math convolution, producing an intermediate output feature map. The intermediate output feature map are then added to the offset α multiplied by the input feature map.

In many embodiments, the offset α is a quantized number, where the quantization parameters are the same as those used in the second term in Equation (6). In this case, the output of Equation (6) can be computed offline and stored in memory directly. During inference, the weights are loaded from memory without any additional operations and the loaded weights are used to perform integer math operations.

In many embodiments, neural processing unit (NPU) and micro-controller unit (MCU) hardware platforms may only support integer operations, which are much cheaper than floating point operations. In one embodiment, any linear operation f, such as a convolution operation, can be decomposed into Equation (7):

$$f(x, Q(w - \text{sign}(w) \cdot \alpha, b, w_{max})) + \alpha \cdot f(x, \text{sign}(w)) \quad (7)$$

where b is the number of quantization bits, and x is the input data. Both terms can then be calculated using only integer math, but since sign(w) is a 1-bit tensor, it does not require any multiplications and is very cheap. In another embodiment, the neural network can be trained and deployed with $Q(Q(w, b, w_{max}, \alpha), b^*; w_{max}')$, such that the inference model is quantized using uniform quantization, with b* chosen to match the common 8-bit data type supported in MCUs and NPUs. The advantage of this embodiment is that model training benefits from the expressivity of Equation (6), while its deployment uses standard 8-bit data. Generally, the second approach, with b* equal to 8 bits, does not incur any loss in accuracy.

Advantageously, combining the modified number system with sparsity directly solves the IO norm constrained, quantized weight objective with traditional stochastic gradient descent. Additionally, the modified number system becomes vital to performance when sparsity is induced during baseline training.

Figure 7:
FIG. 7 presents a graph depicting the accuracy of a neural network trained using two different number systems, according to an embodiment of the present disclosure.
Figure 7:
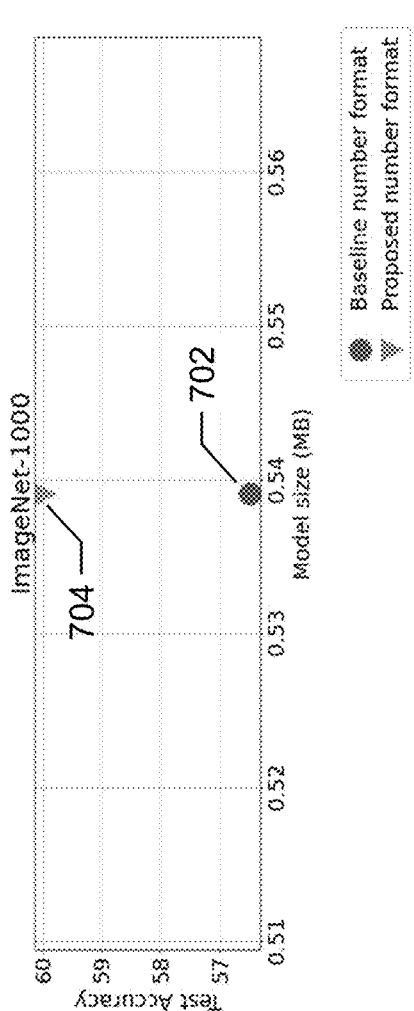

FIG. 7 presents graph 700 depicting the accuracy of a neural network trained using two different number systems, according to an embodiment of the present disclosure.

A neural network was trained on the ImageNet-1000 dataset using the baseline number system, i.e., NN 702, and using the modified number system, i.e., NN 704. Neural network model sizes for pruned models were calculated using a compression scheme that included storing non-zero weights using 4 bits per element, and a binary mask that indicates whether the corresponding element of W is 0 or not. This mask is compressed using a compression algorithm which achieves the entropy limit.

NN 704 achieves a higher test set accuracy than both the binarized and pruned models while having the same model size. Additionally, the modified number system produces at least a 3.5% (absolute) accuracy boost for weight decay values of 1.8e4 for the baseline number system and 1.1e4 for the modified number system at the convergence of training.

In certain embodiments, the above techniques may be used to prune and quantize activations.

In many embodiments, various constraints can be placed on the offset $\alpha$ in Equation (6) depending on the hardware requirements. For example, it may be desirable that offset $\alpha$ is itself quantized to b bits, or even using the same quantizer range $w_{max}$, since this guarantees that the value output by Equation (6) may be used to perform integer arithmetic operations without any additional modifications.

Figure 8:
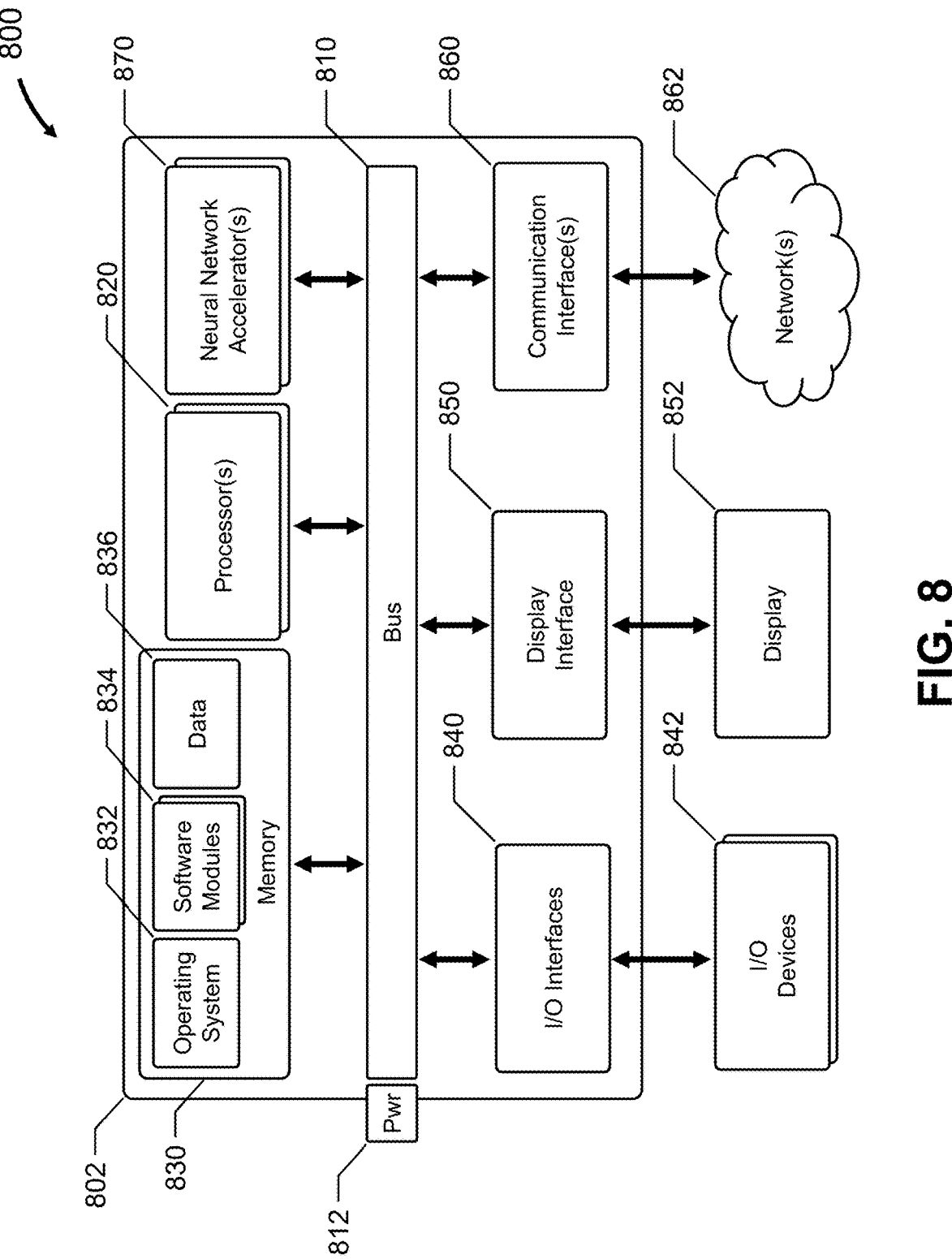
FIG. 8 depicts a block diagram of system, in accordance with an embodiment of the present disclosure.

FIG. 8 depicts a block diagram of system 800, in accordance with an embodiment of the present disclosure.

Generally, system 800 represents the system on which the trained neural network is deployed for inference (e.g., an inference system), which includes one or more processors 820 and may include one or more neural network accelerators 870. System 800 may also represent the system on which the neural network is trained (e.g., a training system), which typically includes multiple processors 820, and, in certain embodiments, may include one or more neural network accelerators 870. In some embodiments, multiple systems 800 may be used to train the neural network.

Computer 802 includes bus 810 coupled to one or more processors 820, memory 830, I/O interfaces 840, display interface 850, one or more communication interfaces 860 and one or more neural network accelerators 870. Generally, I/O interfaces 840 are coupled to I/O devices 842 using a wired or wireless connection, display interface 850 is coupled to display 852, and communication interface 860 is connected to network 862 using a wired or wireless connection.

Bus 810 is a communication system that transfers data between processor 820, memory 830, I/O interfaces 840, display interface 850, communication interface 860, neural network accelerator 870, as well as other components (not depicted). Power connector 812 is coupled to bus 810 and a power supply (not shown).

Processor 820 includes one or more general-purpose or application-specific microprocessors that executes instructions to perform control, computation, input/output, etc. functions for computer 802. Processor 820 may include a single integrated circuit, such as a micro-processing device, or multiple integrated circuit devices and/or circuit boards working in cooperation to accomplish the functions of processor 820. In addition, processor 820 may execute computer programs or modules, such as operating system 832, software modules 834, etc., stored within memory 830. For example, software modules 834 may include an ML application, a neural network application, a CNN application, etc.

Generally, storage element or memory 830 stores instructions for execution by processor 820 and data. Memory 830 may include a variety of non-transitory computer-readable medium that may be accessed by processor 820. In various embodiments, memory 830 may include volatile and non-volatile medium, non-removable medium and/or removable medium. For example, memory 830 may include any combination of random access memory (RAM), dynamic RAM (DRAM), static RAM (SRAM), read only memory (ROM), flash memory, cache memory, and/or any other type of non-transitory computer-readable medium.

Memory 830 contains various components for retrieving, presenting, modifying, and storing data. For example, memory 830 stores software modules that provide functionality when executed by processor 820. The software modules include operating system 832 that provides operating system functionality for computer 802. Software modules 834 provide various functionality, such as image classification using convolutional neural networks, etc. Data 836 may include data associated with operating system 832, software modules 834, etc.

I/O interfaces 840 are configured to transmit and/or receive data from I/O devices 842. I/O interfaces 840 enable connectivity between processor 820 and I/O devices 842 by encoding data to be sent from processor 820 to I/O devices 842, and decoding data received from I/O devices 842 for processor 820. Generally, data may be sent over wired and/or wireless connections. For example, I/O interfaces 840 may include one or more wired communications interfaces, such as USB, Ethernet, etc., and/or one or more wireless communications interfaces, coupled to one or more antennas, such as WiFi, Bluetooth, cellular, etc.

Generally, I/O devices 842 provide input to computer 802 and/or output from computer 802. As discussed above, I/O devices 842 are operably connected to computer 802 using a wired and/or wireless connection. I/O devices 842 may include a local processor coupled to a communication interface that is configured to communicate with computer 802 using the wired and/or wireless connection. For example, I/O devices 842 may include a keyboard, mouse, touch pad, joystick, etc.

Display interface 850 is configured to transmit image data from computer 802 to monitor or display 852.

Communication interface 860 is configured to transmit data to and from network 862 using one or more wired and/or wireless connections. Network 862 may include one or more local area networks, wide area networks, the Internet, etc., which may execute various network protocols, such as, for example, wired and/or wireless Ethernet, Bluetooth, etc. Network 862 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

Neural network accelerator 870 is configured to multiply matrices and generate output matrices to support various applications implemented by software modules 834. Generally, neural network accelerator 870 supports NNs, ANNs, DNNs, CNN, etc.

FIG. 9A depicts flow diagram 900 representing functionality associated with processing a neural network, in accordance with embodiments of the present disclosure.

This functionality is performed by system 800, which typically includes multiple processor 820, and, in certain embodiments, may include one or more neural network accelerator 870. In some embodiments, this functionality may be performed by multiple systems 800.

The functionality at blocks 910 and 920 is performed for at least one layer of the neural network that includes a plurality of weights. In certain embodiments, the functionality at blocks 910 to 920 is performed for at least one fully-connected layer of an ANN, at least one convolutional layer of a CNN, etc. Generally, the number of neural network layers that are pruned and quantized is determined by a number of factors, including, for example, the desired model accuracy, size, performance, etc., layer compressibility, operator type, width, etc.

At 910, an offset function is applied to each of a plurality of weight values in the plurality of weights to generate an offset weight value.

At 920, the offset weight values are quantized to form quantized offset weight values.

Generally, the plurality of weights are pruned. In certain embodiments, at 905, the plurality of weights are pruned by setting each weight value within a range of weight values to be pruned to zero. In these embodiments, the flow begins at 905, flows to 910 and then 930 (dotted flow lines). In other embodiments, at 925, the plurality of weights are pruned by setting each quantized offset weight value within the range of weight values to be pruned to zero. In these embodiments, the flow begins at 910, flows to 920 and then 925.

In further embodiments, at 930, the neural network is trained based, at least in part, on the quantized offset weight values. The weights for the neural network layers that have been pruned and quantized are trained in combination with the weights for the neural network layers that have not been pruned and quantized to generate the final weights for the neural network. In one embodiment, the training includes iteratively quantizing the offset weight values based on learned quantization parameters.

Generally, the quantized offset weight values may be saved in a memory as signed integers, such as, for example, signed 4-bit integers, etc., along with the remaining elements of the neural network.

In one embodiment, the offset value $\alpha$ is equal to a largest value of a range of weight values, the range of weight values having a central weight value In one embodiment, the plurality of weights are pruned based on the range of weight values.

In one embodiment, applying the offset function includes, when the weight value is greater than the central weight value, subtracting the offset value $\alpha$ from the weight value; and when the weight value is less than the central weight value, adding the offset value $\alpha$ to the weight value.

In one embodiment, the central weight value is zero.

In one embodiment, the plurality of weights are pruned by setting each weight value within a range of weight values to be pruned to zero; or the plurality of weights are pruned by setting each quantized offset weight value within the range of weight values to be pruned to zero.

In one embodiment, the plurality of weights are pruned based on a pruning mask.

FIG. 9B depicts flow diagram 1000 representing functionality associated with executing a neural network, in accordance with embodiments of the present disclosure.

At 1010, at least one neural network layer that includes quantized offset weight values and an offset value $\alpha$ is read from a memory. The quantized offset weight values may be signed integer numbers.

At 1020, a neural network layer operation is performed on an input feature map, based on the quantized offset weight values and the offset value $\alpha$, to generate an output feature map.

In many embodiments, the quantized offset weight values are formed by applying an offset function to each of a plurality of weight values in a plurality of weights associated with the neural network layer to generate an offset weight value; and quantizing the offset weight values to form the quantized offset weight values.

In many embodiments, the weight values are pruned by setting each weight value within a range of weight values to be pruned to zero; or the quantized offset weight values are pruned by setting each quantized offset weight value within the range of weight values to be pruned to zero.

In many embodiments, the neural network is trained based, at least in part, on the quantized offset weight values, including iteratively quantizing the offset weight values based on learned quantization parameters.

FIG. 9C depicts flow diagram 1002 representing functionality associated with performing the neural network layer operation 1020, in accordance with embodiments of the present disclosure.

At 1021, a sign tensor is generated based on the quantized offset weight values. The sign tensor is a 1-bit tensor that has the same number of elements as the number of quantized offset weight values.

At 1022, the convolution operation is performed on the input feature map using the quantized offset weight values to generate a first intermediate feature map.

At 1023, the convolution operation is performed on the input feature map using the sign tensor to generate a second intermediate feature map.

At 1024, the offset value $\alpha$ and the second intermediate feature map are multiplied to generate an offset second intermediate feature map.

At 1025, the first intermediate feature map and the offset second intermediate feature map are added to generate the output feature map.

Figure 9D:
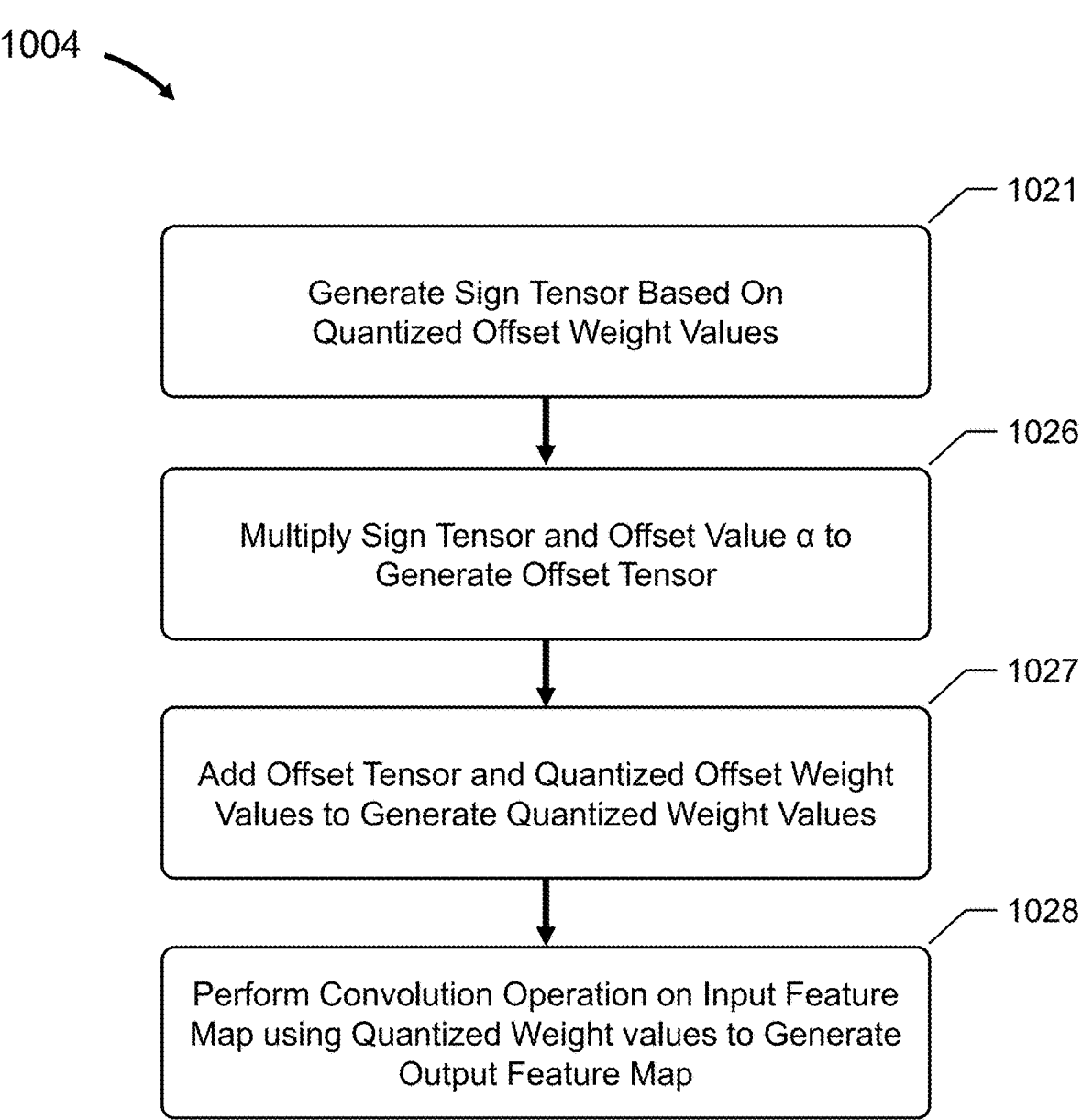

FIG. 9D depicts flow diagram 1004 representing functionality associated with performing the neural network layer operation 1020, in accordance with embodiments of the present disclosure.

At 1021, a sign tensor is generated based on the quantized offset weight values. The sign tensor is a 1-bit tensor that has the same number of elements as the number of quantized offset weight values.

At 1026, the sign tensor and the offset value $\alpha$ are multiplied to generate an offset tensor.

At 1027, the offset tensor and the quantized offset weight values are added to generate quantized weight values.

At 1028, the convolution operation is performed on the input feature map using the quantized weight values to generate the output feature map.

The embodiments described herein are combinable.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method comprising:
processing, by a computer, an initial neural network, said processing including, for at least one neural network layer that includes a plurality of weights W* of the initial neural network:
   for each weight value of the plurality of weights W*:
      applying an offset value $\alpha$ to the weight value to generate an offset weight value;
      quantizing the offset weight value to form a quantized offset weight value of a plurality of quantized offset weight values $W^*_q$; and
      pruning the quantized offset weight based on a range of weight values to produce a pruned quantized weight value of a plurality of pruned quantized weight values $W^*_{qp}$;
   where said processing is based, at least in part, on a hardware requirement of an inference system to which a processed neural network is to be deployed; and
   storing the plurality of pruned quantized offset weight values $W^*_{qp}$ and the offset value $\alpha$ in a memory, the plurality of pruned quantized offset weight values forming at least part of the processed neural network, where the processed neural network has reduced storage cost, inference latency, or power consumption compared to the initial neural network when deployed to the inference system.

2. The method according to claim 1, further comprising:
training the processed neural network based, at least in part, on the pruned quantized offset weight values.

3. The method according to claim 2, where said training includes iteratively quantizing the offset weight values based on learned quantization parameters.

4. The method according to claim 1, where said applying the offset value includes applying an offset value $\alpha$ to each weight value.

5. The method according to claim 4, where the offset value $\alpha$ is equal to a largest value of a range of weight values, the range of weight values having a central weight value.

6. The method according to claim 1, further comprising deploying the processed neural network to the inference system.

7. The method according to claim 1, where said applying the offset value α includes:

when the weight value is greater than the central weight value, subtracting the offset value α from the weight value; and when the weight value is less than the central weight value, adding the offset value α to the weight value.

8. The method according to claim 7, where the central weight value is zero.

9. The method according to claim 1, where:

the plurality of weights W* are pruned by setting each weight value within a range of weight values to be pruned to zero; or the plurality of quantized offset weights W*$_q$ are pruned by setting each quantized offset weight value within the range of weight values to be pruned to zero.

10. The method according to claim 1, where the plurality of weights W* are pruned based on a pruning mask.

11. An apparatus for processing an initial neural network, comprising:

a processor configured to process the initial neural network including:

for at least one neural network layer that includes a plurality of weights W* of the initial neural network:

apply an offset value α to each of a plurality of weight values in the plurality of weights W* to generate an offset weight value; and quantize the offset weight values to form quantized offset weight values W*$_q$;

prune the plurality of quantized offset weights to produce pruned quantized weight values W*$_{qp}$; and store the pruned quantized offset weight values W*$_{qp}$ and the offset value α in a memory, the pruned quantized offset weight values forming at least part of the processed neural network;

the processor further configured to train the processed neural network based, at least in part, on the pruned quantized offset weight values W*$_{qp}$, including iteratively quantize the offset weight values based on learned quantization parameters; where:

said processing of the initial neural network is based, at least in part, on a hardware requirement of the inference system; and the processed neural network has reduced storage cost, inference latency, or power consumption compared to the initial neural network when deployed to the inference system.

12. The apparatus according to claim 11, where:

a range of weight values has a central weight value and a largest weight value; and said apply the offset value α includes:

when the weight value is greater than the central weight value, subtract the offset value α from the weight value, and when the weight value is less than the central weight value, add the offset value α to the weight value.

13. The apparatus according to claim 11, where:

the weight values W* are pruned by setting each weight value within a range of weight values to be pruned to zero; or the quantized offset weight values W*$_q$ are pruned by setting each quantized offset weight value within the range of weight values to be pruned to zero.

* * * * *